July 23, 1963 H. J. RYAN 3,098,588
LINE MARKER
Filed April 4, 1961 2 Sheets-Sheet 1

INVENTOR.
HERL J. RYAN
BY
Lynn H. Latta
ATTORNEY

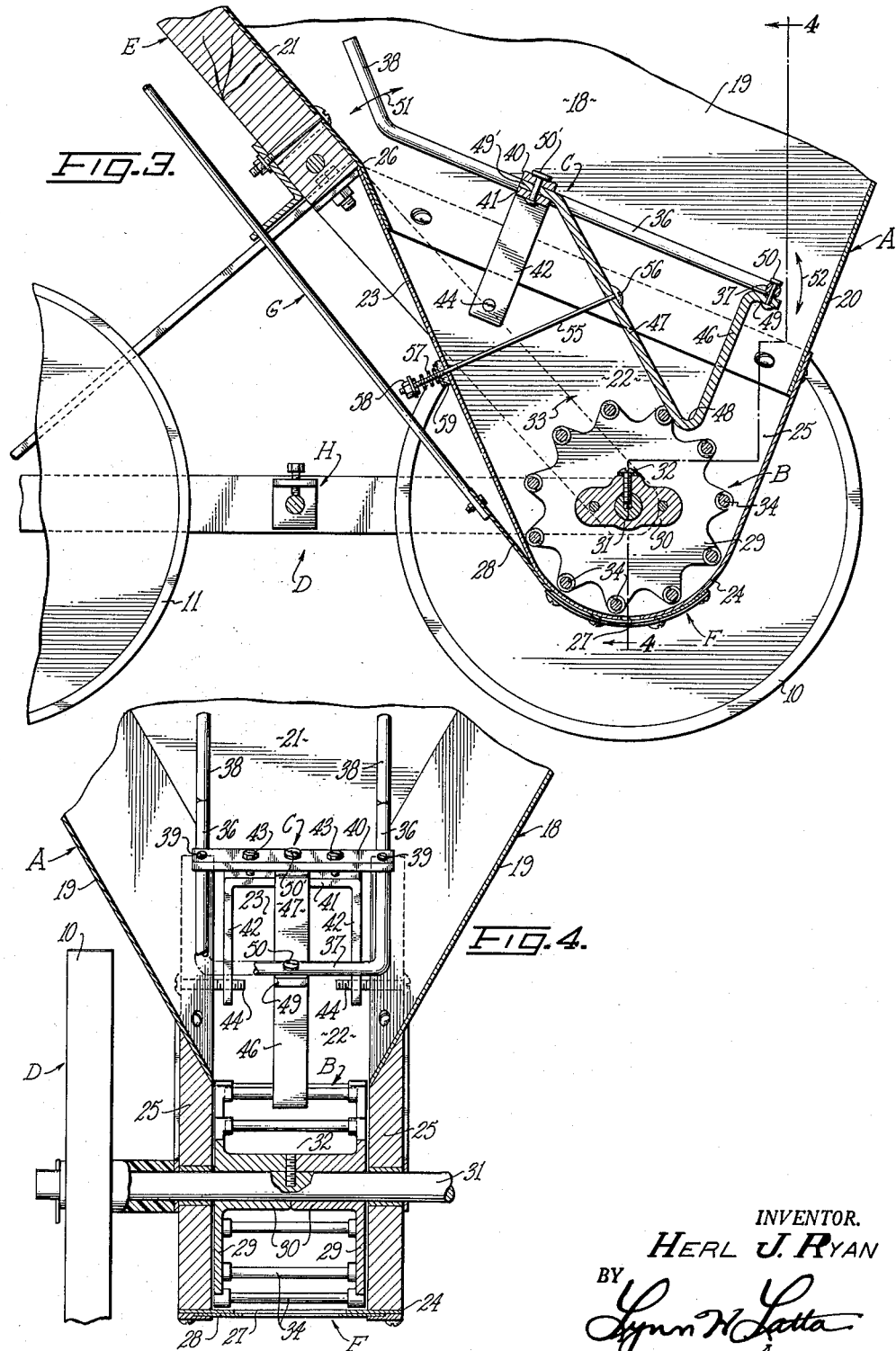

United States Patent Office 3,098,588
Patented July 23, 1963

3,098,588
LINE MARKER
Herl J. Ryan, 3421 Mentone Ave., Los Angeles, Calif.
Filed Apr. 4, 1961, Ser. No. 100,714
12 Claims. (Cl. 222—177)

This application is a continuation in part of my copending application Serial No. 608,159, filed September 5, 1956, and now Patent No. 2,988,250, for Line Marker which co-pending application was a division of my earlier application Serial No. 373,135, filed August 10, 1953, for Line Marker, on which U.S. Patent No. 2,771,223 was issued on December 20, 1956.

The present invention relates in general to a portable line marker apparatus adapted, while travelling in a predetermined path on a playing surface such as an athletic field, tennis court or the like, to deliver a stream of marking powder such as powdered chalk or the like, so as to deposit on the playing surface, a line or series of lines for designating boundaries, divisions etc. More particularly, the invention relates ot a marking apparatus of a type, which may be pushed by hand or motor driven, wherein the marking powder is delivered through a discharge aperture in the bottom of a hopper, to which a constant flow of marking powder, uninterrupted by packing or clogging, is maintained by a rotary agitator of cylindrical cage form which rotates in unison with a pair of traction or drive wheels, as by being secured to the axle thereof; and wherein auxiliary agitator means is provided in the area within the hopper above the rotary agitator and, is vibrated or oscillated by movements imparted thereto by the rotary agitator, whereby to promote the flow of powder from the upper areas of the hopper into contact with the rotary agitator.

The general object of the present invention is to provide an improved agitator mechanism of the general type referred to above.

More specifically, the invention aims to improve upon the vibratory or oscillatory upper agitator of such an apparatus so as to increase its effectiveness in maintaining the flow of marking powder from both the forward and rearward extremities of the upper area of the hopper, adjacent the forward and rear walls of the hopper, which converge downwardly to the hopper bottom, as well as in the area above the rotary agitator intermediate the forward and rear walls of the hopper.

Other objects and advantages will become apparent in the ensuing specification and appended drawing in which:

FIG. 3 is a vertical longitudinal sectional view of the hopper and agitator portions of the apparatus; and FIG. 4 is a vertical transverse sectional view thereof, looking rearwardly as indicated by the line 4—4 of FIG. 3.

Figure 1:
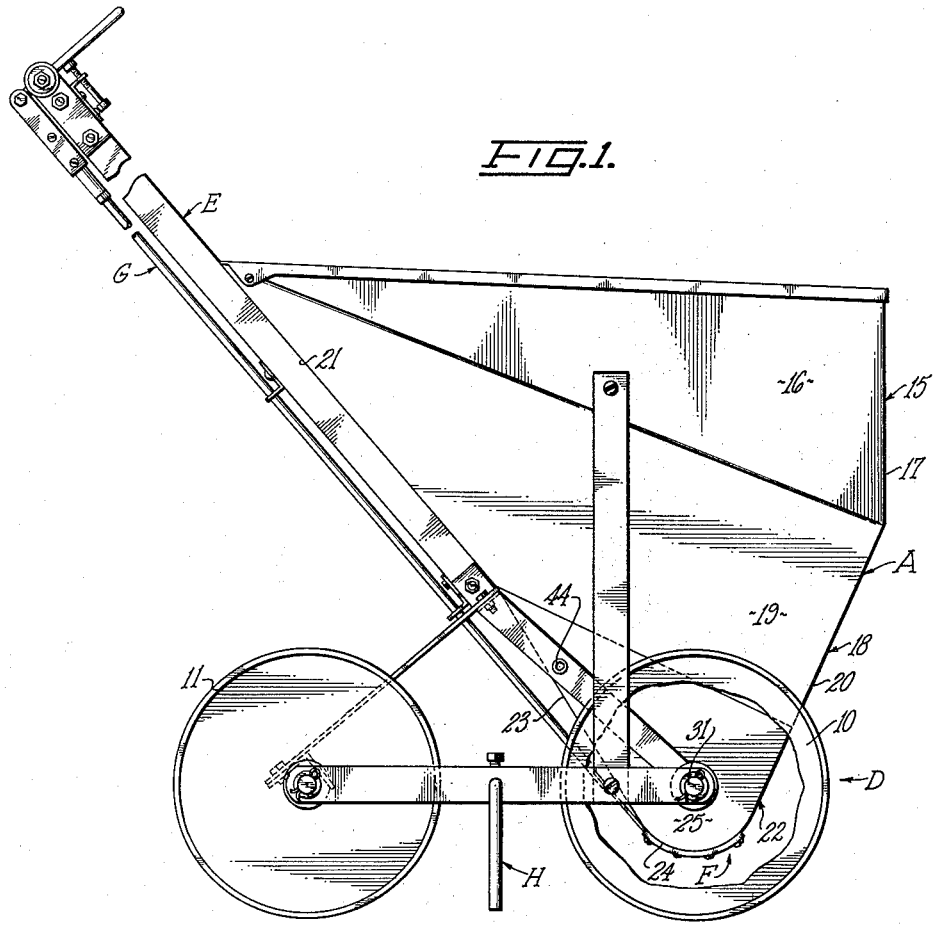
FIG. 1 is a side view of a line marking apparatus embodying my invention.
Figure 2:
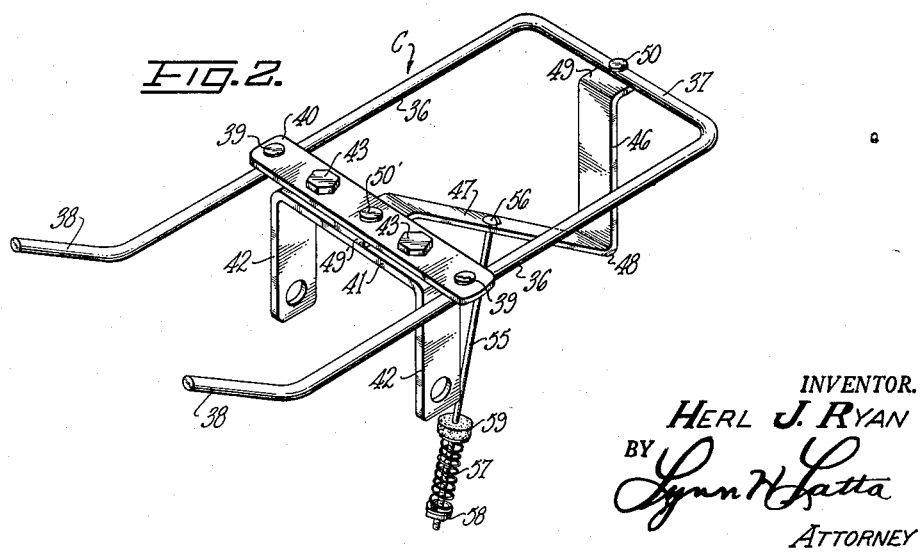
FIG. 2 is a perspective view of the upper agitator unit of the invention.

Referring now to the drawings in detail, I have shown therein, as an example of one form in which the invention may be embodied, a line marking apparatus comprising, in general, a hopper A; a rotary agitator B and an oscillatory agitator C within the hopper A; a wheeled carriage D supporting the hopper A for transportation in a predetermined path over a surface to be marked; a handle E for controlling the travel of the hopper A in its marking path, and for imparting a manual push to the apparatus where a motorized drive is not employed; a gate valve F for controlling the flow of marking powder from the bottom of hopper A; linkage G for actuating the gate valve F; and a line guide or gauge unit H, adjustably mounted in the carriage D, for assisting the operator in maintaining the predetermined marking path. The units D, E, F, G, and H may be substantially as shown in my patent and co-pending application identified above, and are not described in detail herein. In general, it may be noted at this point that by grasping the handle E at its rear end, an operator can walk behind the hopper A while pushing the same over a surface to be marked, the apparatus being transported on a forward pair of traction wheels 10 and a rearward pair of follower wheels 11, with the bottom of hopper A supported in close association with the surface to be marked, so that marking powder delivered through the gate valve F, will deposit thereon a continuous stripe or line, under the control of the actuator linkage G, including an actuator lever at the upper end of handle E.

The hopper A comprises, in general, an upper section 15, which may include laterally spaced, vertical, parallel side walls 16 and a vertical front wall 17; an intermediate throat section 18 comprising downwardly converging side walls 19 (FIG. 4) a front wall 20 (FIG. 3) inclined downwardly and rearwardly, and an upper back wall 21 inclined downwardly and forwardly; and a lower agitator chamber section 22 comprising forward and rear walls 20 and 23, converging downwardly at an angle in the range between 60° and 45° subtended between them, a bottom 24, and vertical side walls 25. One of the important improvements provided for in this invention is an improved agitating action above the shoulder 26 between the steeply sloping rear wall portion 23 and the more moderately sloping upper rear wall portion 21 to prevent packing and blockage of the powdered material supported upon rear wall 21 above this shoulder. Bridging between the lower extremities of forward and rear walls 20 and 23 is the bottom 24 of segmental-cylindrical form in which is provided a discharge aperture 27 which is controlled by the gate valve F, including a flexible arcuate gate 28 sliding forwardly and rearwardly in suitable ways.

The hopper interior is divided generally into an upper full-width area, defined between vertical side walls 16, the intermediate throat 18, defined between downwardly converging side walls 19, and the agitator chamber 22, defined between the laterally spaced parallel vertical side walls 25. The lower marginal portions of downwardly converging throat walls 19 are secured to beveled upper margins of lower side walls 25 as shown in FIG. 4, in overlapping relation thereto so as ot deliver the marking powder from the throat 18 into the agitator chamber 22.

Rotary agitator B is mounted in the agitator chamber 22, for rotation of its periphery in close proximity to the arcuate bottom wall 24. Agitator B comprises a pair of axially spaced spiders 29 having respective hubs 30 mounted upon the axle shaft 31 of the traction wheels 10, and secured thereto as at 32. Shaft 31 in turn is secured to wheels 10 so as to be driven thereby, thereby causing the agitator B to rotate in a forward direction corresponding to forward travel of the wheels 10 over the surface to be marked. Such rotation is indicated by arrow 33 in FIG. 3. Agitator B further includes a plurality of circumferentially spaced actuator-agitator bars 34 bridging between the spiders 29 parallel to the shaft 31 and secured to the spiders 29 at their respective ends. Collectively, the bars 34 define a cylindrical cage, and they are adapted to sweep past the discharge aperture 27 for feeding the marking powder through the aperture, as well as to agitate the powder in the chamber 22 so as to maintain a flow of powder to the aperture 27.

The oscillatory agitator C operates in the throat 18 to promote flow from the throat area downwardly into the agitator chamber 22. It comprises an agitator head in the form of a rectangular U-bar including parallel side arms 36, a cross bar 37 integrally bridging the forward ends of side bars 36, and a pair of agitator fingers 38 formed as integral extensions of the rear ends of side bars 36 and subtending therewith an obtuse angle which may be approximately in the range near 135°, extending upwardly and rearwardly from the rear ends of side bars 36. Extending between side bars 36, intermediate the ends thereof, and secured thereto at 39, is a bridge bar 40. A fulcrum yoke, including a cross web 41 and laterally spaced parallel legs 42 extending downwardly therefrom, is secured to the underside of bridge bar 40 by a pair of tie bolts 43, which may be extended through the bridge bar 40 and threaded into the cross web 41. The lower ends of legs 42 are pivoted upon studs 44 mounted in the side wall member 25 of agitator chamber 22 and projecting inwardly therefrom in axially opposed relation. Agitator C is actuated by a follower of saw tooth form comprising a forward arm 46 having at its upper end an integral tab 49 bent at right angles thereto and secured as by a rivet 50 to the underside of agitator head cross bar 37 at the center thereof, with the arm 46 extending downwardly at right angles to the plane of agitator head 36—38; and a rear arm 47 integrally joined to the lower end of arm 46 by a U-bend 48 which constitutes a nose adapted to drop into the spaces between actuator bars 34. Rear arm 47 extends diagonally upwardly and rearwardly from nose 48 (with respect to the plane of agitator head 36—38) to the center of fulcrum yoke 41, 42, where it terminates in a tab 49' that is secured between bridge bar 40 and web 41 by a bolt or rivet 50' extending through all three of these parts. Follower 46—49 may be fabricated from strap steel as shown, or of round rod or other metal rod stock.

At this point it may be noted that the pivot studs 44 provide a transverse axis upon which the agitator C is fulcrumed for swinging movements of its respective ends as indicated by the double headed arrows 51 and 52. The movements of cross bar 37 at the forward end of head 36—38 are substantially vertical (cross bar 37 being nearly at the same level as the axis of pivots 44) and is effective to move the marking powder downwardly along front wall 20, preventing any packing of the powder in the forward area of throat 18. The oscillatory movements of agitator fingers 38 at the rear end of head 36—38 are on an inclined path (indicated by double arrow 51) substantially normal to the upper rear wall 21 and in opposed relation to the lower portion thereof just above shoulder 26, for promoting downward flow of the powder along the upper rear wall 21, over the shoulder 26 and into the rear area of agitator chamber 22. Downward flow from the upper rear area of agtitator chamber 22 to the lower area thereof is assisted by substantially horizontal oscillating movement of the fulcrum yoke 41, 42. Intermediate the forward and rear walls 20 and 23 of chamber 22, the body of powder in the hopper is agitated by vertical oscillating movements of the follower 46, 47 and of head 36, 37. Thus it is assured that the agitator chamber 22 will remain full of powder at all times.

Oscillating movements of agitator C are generated by opposing forces exerted by the agitator bars 34, riding forwardly against the under side of the diagonal arm 47 of the follower, functioning to alternately lift the agitator C with a camming action against diagonal follower arm 47, resulting in upward and rearward swinging movement of the agitator head 36—38; and a yielding downward and rearward pull, exerted against diagonal arm 47 by a pull rod 55 which causes the nose 48 to sharply drop between a pair of the actuator bars 34 when it rides off the forward bar of this pair, and to consequently swing the agitator head forwardly, its forward end moving downwardly and the agitator fingers 38 moving forwardly. Pull rod 55 extends through an aperture in diagonal follower arm 47, has a head 56 engaged against arm 47, extends through an aperture in the rear hopper wall 23 near its lower end, and is loaded by a coil spring 57 encircling said lower end under compression between a nut and washer assembly 58 threaded onto said lower end and a washer 59 bearing against rear wall 23.

In the rearward movement of agitator head 36—38, agitator fingers 38 will move rearwardly and downwardly to close proximity to upper rear wall 21, and are adapted to engage the wall 21 to limit the rearward throw of the agitator C when the forward movement of the apparatus is sufficiently rapid to produce a vigorous impelling effect in the camming action of actuator bars 34 against the follower 46, 47. Such contact of the agitator fingers 38 against rear wall 21 produces a tapping effect resulting in vibration of the wall 21 to further facilitate the downward flow of powder thereover, and the rebound of the fingers 38 from the resilient areas of wall 21 on respective sides of the shaft of handle E, increases the rapidity of the return of the agitator in the forward swing direction, thus further increasing the effectiveness of its agitating action. When in contact with wall 21, fingers 38 are parallel thereto.

I claim:

1. Line-marking apparatus comprising: a hopper for holding a quantity of line-marking powder and having a bottom provided with a discharge aperture; a rotary actuator disposed within said hopper adjacent said bottom and having a plurality of circumferentially spaced actuator elements; a shaft extending transversely through said hopper and through said rotary actuator and secured to the latter for driving it; traction wheels mounted on end portions of said shaft externally of the hopper, at least one of said wheels having means for transmitting drive to said shaft when rotated in response to forward movement of the hopper; means for transmitting forward movement to the hopper; and oscillatory agitator mechanism within the hopper, comprising a rocker head extending longitudinally in said hopper, including a forward portion disposed above said rotary actuator and a rearward portion disposed rearwardly of said rotary actuator, fulcrum means projecting downwardly from an intermediate portion of said rocker head and pivoted to said hopper on a transverse axis behind and parallel to the rotational axis of said actuator, supporting said rocker head for combined vertical rocking and longitudinal swinging movements of said rocker head such as to feed said body of powder from the upper area thereof downward into the bottom area of the hopper, and a follower on the forward end of said rocker head riding on said actuator elements and successively engaged thereby and moved radially outwardly from said rotational axis so as to generate said rocking and swinging movements of the rocker head.

2. Line-marking apparatus comprising: a hopper for holding a quantity of line-marking powder and having a bottom provided with a discharge aperture; a rotary actuator disposed within said hopper and having a plurality of circumferentially spaced actuator elements; a shaft extending transversely through said hopper and having a driving connection with said rotary actuator for rotating it within the hopper; traction wheels mounted on end portions of said shaft externally of the hopper, at least one of said wheels having means for transmitting drive to said shaft when rotated in response to forward movement of the hopper; means for transmitting forward movement to the hopper; and oscillatory agitator mechanism within the hopper, comprising a rocker head extending longitudinally in said hopper, above said rotary, fulcrum means projecting downwardly from an intermediate portion of said rocker head and pivoted to said hopper on a transverse axis, supporting said rocker head for combined vertical rocking and longitudinal swinging movements of said rocker head such as to feed said body of powder from the upper area thereof downwardly into the bottom area of the hopper, and a follower on said rocker head riding on said actuator elements and successively engaged thereby so as to generate said rocking and swinging movements.

3. Line-marking apparatus comprising: a hopper for holding a quantity of line-marking powder and having a bottom provided with a discharge aperture; a rotary actuator disposed within said hopper and having a plurality of circumferentially spaced actuator elements; means mounting said actuator for rotation on a transverse axis; means for rotating said actuator in a direction in which said actuator elements move forwardly in its upper area; and oscillatory agitator mechanism comprising a rocker head extending longitudinally within said hopper above said rotary actuator, fulcrum means projecting downwardly from an intermediate portion of said rocker head and pivoted to said hopper on an axis parallel to the rotational axis of said actuator, supporting said rocker head for combined vertical rocking and longitudinal swinging movements; means yieldingly urging said rocker forwardly and downwardly at its forward end; said rocker head riding on said actuator elements and successively engaged thereby so as to generate said rocking and swinging movements.

4. Line-marking apparatus comprising: a hopper for holding a quantity of line-marking powder and having a bottom provided with a discharge aperture; wheels mounting said hopper for travel over a surface to be marked; a rotary agitator-actuator mounted within said hopper adjacent said bottom for rotation on axis transverse to the path of travel and having a plurality of circumferentially spaced agitator-actuator elements extending parallel to said axis; means for rotating said agitator-actuator so as to effect forward movement of said agitator-actuator elements in the upper area of their path of rotation, and rearward sweep thereof past said discharge aperture in close proximity to said hopper bottom in the lower area of said path of rotation, for promoting flow of the powder to and through said aperture; and oscillatory agitator mechanism comprising a rocker head extending longitudinally in said hopper in an upwardly and rearwardly inclined position, including a forward portion disposed above said rotary agitator-actuator and a rearward portion disposed behind the same, fulcrum means projecting downwardly from an intermediate portion of said rocker head and pivoted to said hopper on a transverse axis behind and parallel to the rotational axis of said actuator, supporting said rocker head for combined vertical rocking and longitudinal swinging movement of said rocker head such as to feed said body of powder from the upper area thereof downwardly into the bottom area of the hopper; means yieldingly urging said rocker head forwardly and downwardly at its forward end; and a follower on the forward end of said rocker head riding on said agitator-actuator elements and successively engaged thereby and moved radially outwardly from the rotational axis thereof so as to generate said rocking and swinging movements.

5. Line-marking apparatus comprising: a hopper for holding a quantity of line-marking powder; transportation means mounting said hopper for travel over a surface to be marked; said hopper including a bottom of segmental-cylindrical form generated around an axis transverse to the path of said travel, a back wall inclined upwardly and rearwardly from the rear extremity of said bottom, and side walls extending upwardly from said bottom and back walls, said bottom having a discharge aperture; a rotary agitator-actuator mounted within said hopper for rotation on said transverse axis and having a plurality of circumferentially spaced actuator elements extending parallel to said axis and collectively defining the periphery of a cylindrical cage adapted to sweep across said aperture in close proximity to said bottom; means for rotating said actuator in a direction in which said actuator elements move forwardly in its upper area; and an oscillatory agitator comprising a rocker head extending longitudinally in said hopper in an upwardly and rearwardly inclined position, including a forward portion disposed above said rotary actuator and a rearward portion disposed rearwardly therefrom and adjacent said rear hopper wall, fulcrum means projecting downwardly from an intermediate portion of said rocker head and pivoted to said hopper on an axis behind and parallel to the rotational axis of said actuator, supporting said rocker head for combined vertical rocking and longitudinally swinging movements of said rocker head with the rear end of said agitator head moving toward and from said back wall in close proximity thereto so as to feed said body of powder downwardly along said back wall and into the bottom area of the hopper occupied by said rotary agitator-actuator; means yieldingly urging said rocker head forwardly and downwardly at its forward end; and a follower on the forward end of said rocker head riding on said agitator-actuator elements and successively engaged thereby and moved upwardly to generate said rocking and swinging movements.

6. Line-marking apparatus as defined in claim 5, wherein said agitator head has at its said rear end, agitator means bent upwardly from the general plane of said head, adapted to assume closely adjacent, parallel relation to said rear wall at the rearward limit of swinging movement of said head.

7. Line-marking apparatus comprising: a hopper for holding a quantity of line-marking powder; transportation means mounting said hopper for travel over a surface to be marked; said hopper including a bottom of segmental-cylindrical form generated around an axis transverse to the path of said travel, said bottom having a discharge aperture, a lower back wall and a forward wall respectively inclined rearwardly and forwardly and steeply upwardly from the respective rearward and forward extremities of said bottom, an upper back wall inclined upwardly and rearwardly from the upper extremity of said lower back wall at a less steep incline, lower side walls disposed in laterally spaced vertical planes and joined to said bottom and lower back and forward walls to define an agitator chamber in the lower area of said hopper, intermediate side walls diverging laterally outwardly and upwardly from the upper extremities of said lower side wall and joined to said forward and back walls to define a hopper throat; a rotary agitator-actuator of cage form mounted within said agitator chamber for rotation on said transverse axis and having a plurality of circumferentially spaced agitator-actuator bars extending parallel to said axis in cylindrical array for rotation in a path sweeping across said aperture in close proximity to said bottom; means for rotating said agitator-actuator in a direction in which said agitator-actuator elements move forward in its upper area; and oscillatory agitator mechanism comprising a rocker head disposed in said hopper throat, extending longitudinally therein in an upwardly and rearwardly inclined position, with its forward portion disposed above said rotary agitator-actuator and its rearward extremity adjacent the lower extremity of said upper back wall behind said rotary agitator-actuator, fulcrum means projecting downwardly from an intermediate portion of said rocker head and pivoted to said hopper on a transverse axis behind and parallel to the rotational axis of said agitator-actuator, supporting said rocker head for combined vertical rocking and longitudinally swinging movements of said rocker head such as to feed said body of powder downwardly over said upper and lower back walls and into said agitator chamber, and a follower on the forward end of said rocker head, projecting downwardly therefrom and riding on said agitator-actuator elements and successively engaged thereby so as to generate said rocking and swinging movements.

8. Line-marking apparatus comprising: a hopper for holding a quantity of line-marking powder and having a bottom provided with a discharge aperture and a back wall inclined upwardly and rearwardly therefrom; transportation means mounting said hopper for travel over a surface to be marked; a rotary agitator-actuator mounted within said hopper for rotation on a transverse axis, and having a plurality of circumferentially spaced, axially extending agitator-actuator elements; means for rotating said actuator in a direction in which said agitator-actuator elements move forwardly in its upper area; oscillatory agitator mechanism within the hopper above said rotary agitator-actuator, comprising a rocker head extending longitudinally in a rearwardly and upwardly inclined position, with its forward portion above said rotary agitator-actuator and its rear portion adjacent said back wall; fulcrum means secured to and projecting downwardly from an intermediate portion of said rocker head and pivoted to said hopper on a transverse axis for combined vertical rocking and longitudinally swinging movements of said rocker head such as to feed said body of powder downwardly along said back wall and into communication with said rotary agitator-actuator, and a follower on the forward end of said rocker head, riding on said actuator elements and successively engaged thereby for transmitting said rocking and swinging movements to said rocker head.

9. Line-marking apparatus as defined in claim 8, wherein said rocker head is of rectangular U-bar form including parallel longitudinally extending side bars and a forward cross bar integrally joining the forward ends of said side bars; and wherein said fulcrum means comprises a yoke having at its upper end a transverse web secured to said side bars and having laterally spaced legs extending downwardly from said transverse web and having their lower ends pivoted to said hopper.

10. Line-marking apparatus as defined in claim 9, wherein said follower is of saw tooth form including a forward arm secured to and extending downwardly from said cross bar and a rearward arm joined integrally to the lower end of said forward arm at its forward end and inclined upwardly and rearwardly therefrom and secured to said transverse web of said fulcrum yoke.

11. Apparatus as defined in claim 10, including a tie rod attached to and extending downwardly and rearwardly from said rear arm to the follower and through an aperture in said back wall of the hopper, and spring means encircling the lower end portion of said tie rod and engaged under compression between the lower end thereof and said back wall for yieldingly urging said follower downwardly into engagement with said rotary agitator-actuator.

12. Line-marking apparatus as defined in claim 8, wherein said rocker head is of rectangular U-bar form including parallel longitudinally extending side bars and a forward cross bar integrally joining the forward ends of said side bars; and wherein the rear ends of said side bars are bent upwardly at an obtuse angle to the general plane of said agitator head, to provide agitator fingers which are disposed in closely adjacent, parallel relation to said back wall in the rearward limit of swinging movement of said agitator head, and adapted to contact said back wall to establish said rearward limit.

References Cited in the file of this patent
UNITED STATES PATENTS

| 1,783,092 | Lewis | Nov. 25, 1930 |
| 2,710,117 | Fritz et al. | June 7, 1955 |
| 2,771,223 | Ryan | Nov. 20, 1956 |